United States Patent
Tanaka

(10) Patent No.: US 9,518,504 B2
(45) Date of Patent: Dec. 13, 2016

(54) AIR INTAKE STRUCTURE OF ENGINE AND MOTORCYCLE HAVING THE SAME

(71) Applicant: KAWASAKI JUKOGYO KABUSHIKI KAISHA, Hyogo (JP)

(72) Inventor: Yoshinobu Tanaka, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/358,151

(22) PCT Filed: Nov. 14, 2012

(86) PCT No.: PCT/JP2012/079496
§ 371 (c)(1),
(2) Date: May 14, 2014

(87) PCT Pub. No.: WO2013/073566
PCT Pub. Date: May 23, 2013

(65) Prior Publication Data
US 2014/0299113 A1  Oct. 9, 2014

(30) Foreign Application Priority Data
Nov. 17, 2011 (JP) .................................. 2011-251432

(51) Int. Cl.
 *F02B 33/44* (2006.01)
 *F02B 29/04* (2006.01)
 (Continued)

(52) U.S. Cl.
CPC ............... *F02B 33/32* (2013.01); *B62K 11/04* (2013.01); *F02B 29/0412* (2013.01);
(Continued)

(58) Field of Classification Search
CPC ... F02B 33/32; F02B 29/0412; F02B 29/0462; F02B 29/0437; F28D 1/0316; F28D 1/0325; F28F 1/126; F28F 1/06
(Continued)

(56) References Cited

U.S. PATENT DOCUMENTS 4,236,492 A  12/1980  Tholen
4,480,439 A  11/1984  Yamane
(Continued)

FOREIGN PATENT DOCUMENTS

DE  10 2009 025 282  12/2010
EP  2 075 181  7/2009
(Continued)

OTHER PUBLICATIONS

Machine translation of JP 2006090209 A .*
(Continued)

*Primary Examiner* — Thai Ba Trieu
*Assistant Examiner* — Ngoc T Nguyen
(74) *Attorney, Agent, or Firm* — Wenderoth, Lind & Ponack, L.L.P.

(57) ABSTRACT

The present invention provides an air intake structure of an engine capable of cooling intake air compressed by a supercharger by reducing pressure loss. An air intake structure of an engine (13) having a supercharger (20) supercharging air and an air intake chamber (22) receiving the air supercharged by the supercharger (20) and sending the supercharged air to the engine, wherein a throttle body (23) is connected to the air intake downstream side of the air intake chamber (22), wherein an air intake port (131a) of a cylinder head (131) of the engine (13) is connected to the air intake downstream side of the throttle body (23), wherein a liquid cooling type intercooler (30) is provided in the air intake chamber (22).

17 Claims, 9 Drawing Sheets

(51) Int. Cl.
F02B 33/00 (2006.01)
F02B 33/32 (2006.01)
F02M 35/16 (2006.01)
B62K 11/04 (2006.01)

(52) U.S. Cl.
CPC ...... *F02B 29/0437* (2013.01); *F02B 29/0443* (2013.01); *F02B 29/0462* (2013.01); *F02M 35/162* (2013.01); *Y02T 10/146* (2013.01)

(58) Field of Classification Search
USPC ............... 60/605.3, 599; 123/563, 559.1; 165/152–153
See application file for complete search history.

(56) References Cited

U.S. PATENT DOCUMENTS

| | | | | |
|---|---|---|---|---|
| 4,550,790 | A * | 11/1985 | Link | E21B 10/46 175/393 |
| 4,760,703 | A * | 8/1988 | Minami | F02B 33/44 60/611 |
| 5,775,282 | A * | 7/1998 | Smith | 123/525 |
| 6,371,092 | B1 | 4/2002 | Guglielmo et al. | |
| 7,559,308 | B2 * | 7/2009 | Matsuda | F02B 75/20 123/195 AC |
| 7,644,705 | B2 * | 1/2010 | Ozdemir | 123/557 |
| 2003/0131831 | A1 | 7/2003 | Renkonen | |
| 2005/0199382 | A1 | 9/2005 | Flik et al. | |
| 2007/0261815 | A1 | 11/2007 | Melby et al. | |
| 2008/0275621 | A1 * | 11/2008 | Kobayashi | 701/103 |
| 2010/0096101 | A1 * | 4/2010 | Braun et al. | 165/152 |
| 2010/0175943 | A1 * | 7/2010 | Bergmann | H02K 41/03 180/168 |
| 2010/0175946 | A1 * | 7/2010 | Karube et al. | 123/563 |
| 2011/0094484 | A1 * | 4/2011 | Peterson | 123/568.12 |
| 2011/0160984 | A1 * | 6/2011 | Inoue | 701/108 |
| 2012/0018127 | A1 | 1/2012 | Iwasaki | |

FOREIGN PATENT DOCUMENTS

| | | | | |
|---|---|---|---|---|
| JP | 54-118907 | | 9/1979 | |
| JP | 58-25622 | | 2/1983 | |
| JP | 59-24866 | | 7/1984 | |
| JP | 2-24283 | | 1/1990 | |
| JP | 2-24284 | | 1/1990 | |
| JP | 4-153524 | | 5/1992 | |
| JP | 59-86314 | | 6/1994 | |
| JP | 2001-248448 | | 9/2001 | |
| JP | 2003-227340 | | 8/2003 | |
| JP | 2005-530123 | | 10/2005 | |
| JP | 2006090209 | A * | 4/2006 | F02B 29/04 |
| JP | 2006-248333 | | 9/2006 | |
| JP | 2007-303812 | | 11/2007 | |
| JP | 2009-173259 | | 8/2009 | |
| WO | 2010/110111 | | 9/2010 | |

OTHER PUBLICATIONS

International Search Report dated Dec. 25, 2012 issued in International (PCT) Application No. PCT/JP2012/079496.
Supplementary European Search Report (ESR) issued Apr. 24, 2015 in corresponding European Patent Application No. EP 12850021.2.
Office Action issued Jun. 10, 2016 in European patent application No. 12850021.2.

* cited by examiner

AIR INTAKE STRUCTURE OF ENGINE AND MOTORCYCLE HAVING THE SAME

TECHNICAL FIELD

The present invention relates to an air intake structure an engine and a motorcycle having the same.

BACKGROUND ART

An air intake structure of an engine sometimes has a supercharger increasing the amount of intake air into the engine to improve the output of the engine. The temperature of the intake air compressed by the supercharger is increased. Consequently, the engine cannot obtain a sufficient output and is likely to cause knocking. Therefore, as described in Patent Document 1, when the air intake is compressed by the supercharger, an intercooler for cooling the intake air is typically provided on the air intake downstream side of the supercharger.

PRIOR ART DOCUMENTS

Patent Documents

Patent Document 1: Japanese Patent Laid-open Publication (JP-A) No. 2009-173259

SUMMARY OF THE INVENTION

Problems to be Solved by the Invention

As described in Patent Document 1, to cool the intake air with running wind, the air cooling type intercooler is preferably mounted at the front of the vehicle body and in front of the engine. However, in such an intercooler mounting position, the air intake passage becomes long, resulting in great pressure loss. The output improving effect by cooling the intake air cannot be sufficiently obtained.

Accordingly, an object of the present invention is to provide an air intake structure of an engine capable of cooling intake air compressed by a supercharger by reducing pressure loss.

Solutions to the Problems

A first aspect of the present invention provides an air intake structure of an engine having a supercharger supercharging air and an air intake chamber receiving the air supercharged by the supercharger and sending the supercharged air to the engine, wherein a throttle body is connected to the air intake downstream side of the air intake chamber, wherein an air intake port of a cylinder head of the engine is connected to the air intake downstream side of the throttle body, wherein a liquid cooling type intercooler is provided in the air intake chamber.

According to the configuration, the liquid cooling type intercooler is provided in the air intake chamber. Therefore, it is unnecessary to provide an air intake passage for passing intake air through the intercooler. Pressure loss for cooling the intake air can thus be reduced. In addition, the present invention is applied to a motorcycle in which the space for arranging each vehicle member is limited. Therefore, the vehicle can be maintained compact.

Preferably, the first aspect of the present invention further has the following configurations.

(1) A fuel injector is provided on the air intake downstream side of the intercooler and in the inlet of the throttle body.

(2) The intercooler is a plate type cooling device having a plurality of plates each incorporating a cooling liquid passage and cooling air passing through therebetween, and the plates are stacked to be spaced from each other in the direction perpendicular to the air intake direction.

(3) In configuration (2), a plurality of fins are formed on at least one side of each of the plates.

(4) In the air intake chamber, a volume portion having a fixed volume is provided on the air intake upstream side of the intercooler, and in the mounting portion of the intercooler in the air intake chamber, the cross-sectional area of the intercooler perpendicular to the air-intake direction is substantially equal to the cross-sectional area of the air intake chamber perpendicular to the air intake direction.

(5) The throttle body and the air intake chamber are floating supported to be shifted relative to the engine.

(6) The intercooler circulates engine cooling water to cool intake air.

(7) The intercooler circulates cooling liquid via a dedicated pump and a dedicated radiator to cool intake air.

(8) One or more upstream intercoolers are arranged side by side in the air intake direction in the air intake chamber, and one or more downstream intercoolers are arranged side by side in the air intake direction on the air intake downstream side of the one or more upstream intercoolers, each upstream intercooler circulates the engine cooling water to cool intake air, and each downstream intercooler circulates the cooling liquid via the dedicated pump and the dedicated radiator to cool intake air.

(9) In configuration (8), the fuel injector is provided on the air intake downstream side of the downstream intercooler and in the inlet of the throttle body.

(10) In configuration (6) or (8), on the upstream side of the engine cooling water, a cooling water pipe for the engine cooling water is branched into a side flowing into the engine and a side flowing into the intercooler.

(11) In configuration (7), the dedicated pump is an electrically operated pump.

(12) In configuration (7), the dedicated radiator is arranged side by side in the up-down direction with respect to an engine radiator.

According to configuration (1), a fuel is injected on the air intake downstream side of the intercooler and from the inlet of the throttle body. Therefore, intake air cooled by the intercooler can be further cooled with the vaporization heat of the fuel. As a result, the output of the engine can be further improved.

According to configuration (2), the intercooler has the plates each incorporating a cooling liquid passage and stacked to be spaced from each other in the direction perpendicular to the air intake direction. The flow of intake air which passes through between the plates to be cooled can be straightened by the plates. As a result, the intake air can be smoothly sent from the air intake chamber to the throttle body.

According to configuration (3), the contact area of each of the plates with intake air can be made larger. Therefore, the intake air cooling effect of the intercooler can be improved.

According to configuration (4), the volume portion is provided on the upstream side of the intercooler. Therefore, intake air to enter into the intercooler is made uniform by the volume portion, and can be uniformly sent to the intercooler. In addition, the cross-sectional area of the intercooler perpendicular to the air intake direction is substantially equal to the cross-sectional area of the air intake chamber perpendicular to the air intake direction. Therefore, all of intake air in the air intake chamber passes through the interior of the intercooler, and can be effectively cooled.

According to configuration (5), the throttle body and the air intake chamber are floating supported relative to the engine. Therefore, vibration can be unlikely to be transmitted from the engine to the throttle body and the air intake chamber. As a result, damage to the throttle body and the air intake chamber due to vibration can be prevented.

According to configuration (6), the intercooler circulates the engine cooling water to cool intake air. Therefore, it is unnecessary to provide the cooling system. The cooling equipment can thus be streamlined.

According to configuration (7), the intercooler circulates the cooling liquid via the dedicated pump and the dedicated radiator to cool intake air. As compared with the use of the engine cooling water, the use of the cooling liquid at low temperature can improve the intake air cooling effect.

According to configuration (8), intake air at high temperature is cooled by each upstream intercooler using the engine cooling water, and is then cooled by each downstream intercooler using the dedicated radiator. That is, the upstream intercooler is combined with the downstream intercooler. Therefore, the intake air can be cooled more efficiently than when it is cooled only by the downstream intercooler. The cooling performance required for the downstream intercooler can thus be reduced.

According to configuration (9), the fuel is injected on the air intake downstream side of the downstream intercooler and from the inlet of the throttle body. Therefore, intake air cooled by the downstream intercooler can be further cooled with the vaporization heat of the fuel. As a result, the output of the engine can be further improved.

According to configuration (10), the cooling water to cool the engine can be supplied to the intercooler.

According to configuration (11), the dedicated pump for the intercooler is an electrically operated pump. Since the dedicated pump is not operated by the rotation of the rotational shaft of the engine, intake air can be efficiently cooled by the intercooler.

According to configuration (12), the dedicated radiator for the intercooler can be easily arranged.

A second aspect of the present invention provides a motorcycle having the air intake structure of the first aspect.

According to the configuration, the motorcycle having the effect of the first aspect can be provided.

Effects of the Invention

According to the present invention, the air intake structure of the engine capable of cooling intake air compressed by the supercharger by reducing pressure loss can be provided.

EMBODIMENTS OF THE INVENTION

First Embodiment

Figure 1:
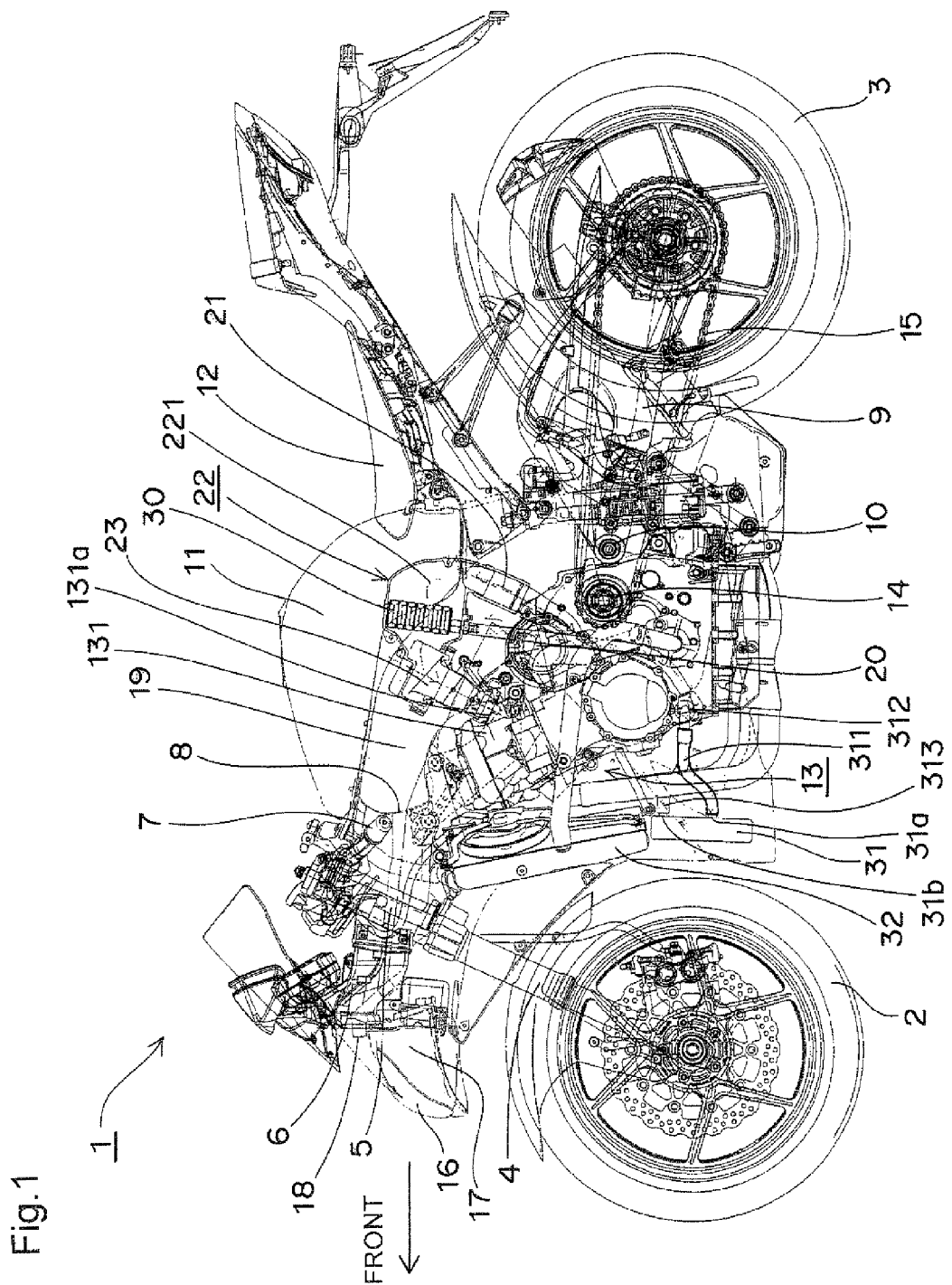
FIG. 1 is a left side view of a motorcycle having an air intake structure of an engine according to a first embodiment of the present invention.

FIG. 1 is a left side view of a motorcycle 1 having an air intake structure of an engine according to a first embodiment of the present invention. FIG. 1 shows the perspective state of a front cowl covering a body frame and the like. The concept of the direction used in this embodiment coincides with the concept of the direction seen from the rider on the motorcycle 1.

As shown in FIG. 1, the motorcycle 1 has a front wheel 2, and a rear wheel 3. The front wheel 2 is rotatably supported in the lower portion of a front fork 4 extended in the substantially up-down direction. The front fork 4 is supported by a steering shaft 5. The steering shaft 5 is rotatably supported by a head pipe 6. A bar type steering wheel 7 extended in the left-right direction is mounted on an upper bracket (not shown) provided at the upper end of the front fork 4. Therefore, the rider swings the steering wheel 7 in the left-right direction to steer the front wheel 2 about the steering shaft 5 as a rotational shaft.

A body frame 8 is extended rearward from the head pipe 6. At the rear lower end of the body frame 8, the front end of a swing arm 9 is axially supported by a pivot bolt 10. The rear wheel 3 is rotatably supported at the rear end of the swing arm 9. A fuel tank 11 is arranged above the body frame 8 and behind the steering wheel 7. A seat 12 for the rider is arranged behind the fuel tank 11. A parallel four-cylinder engine 13 is arranged below the fuel tank 11. An output sprocket 14 is arranged in the rear portion of the engine 13. The power from the output sprocket 14 is transmitted via a chain 15 to the rear wheel 3.

A head lamp 16 is arranged in front of the steering wheel 7, and is covered by a front cowl 17. An air intake duct 18 is arranged in the upper portion of the head lamp 16, and takes in air (running wind). The air taken in from the air intake duct 18 passes through an air intake passage 19 formed in the head pipe 6 (in a head box) and in the body frame 8, and is then sent to an air cleaner (not shown) above the engine 13. The air purified by the air cleaner is rotated and compressed by a supercharger 20 provided on the air intake downstream side of the air cleaner, passes through an air intake duct 21 connected to the supercharger 20 and extended rearward and upward, and is sent to an air intake chamber 22 arranged below the fuel tank 11. The supercharger 20 is arranged behind the cylinders of the engine 13. The air intake chamber 22 is arranged above the rear portion of the engine 13 and above the supercharger 20.

An intercooler 30 is provided in the air intake chamber 22, and cools the air at high temperature compressed by the supercharger 20. The air cooled by the intercooler 30 is sent to a throttle body 23 connected to the air intake downstream side of the air intake chamber 22, and is then mixed with a fuel from the fuel tank 11 in the throttle body 23 to be a combustion gas. The combustion gas in the throttle body 23 is sent from an air intake port 131a of a cylinder head 131 the engine 13 to the combustion chamber of the engine 13.

Figure 2:
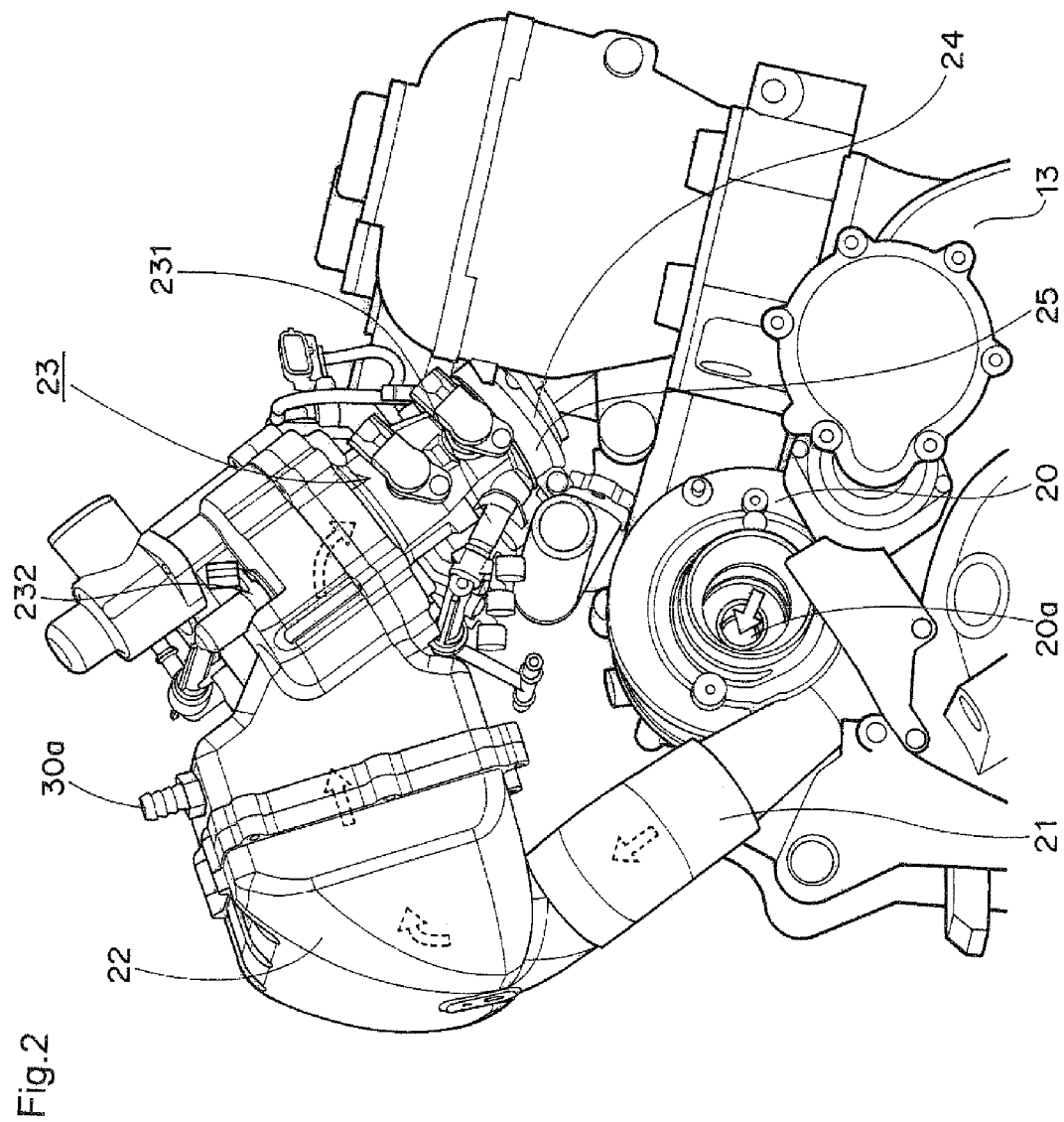
FIG. 2 is a right perspective view of the vicinity of an air intake chamber.
Figure 3:
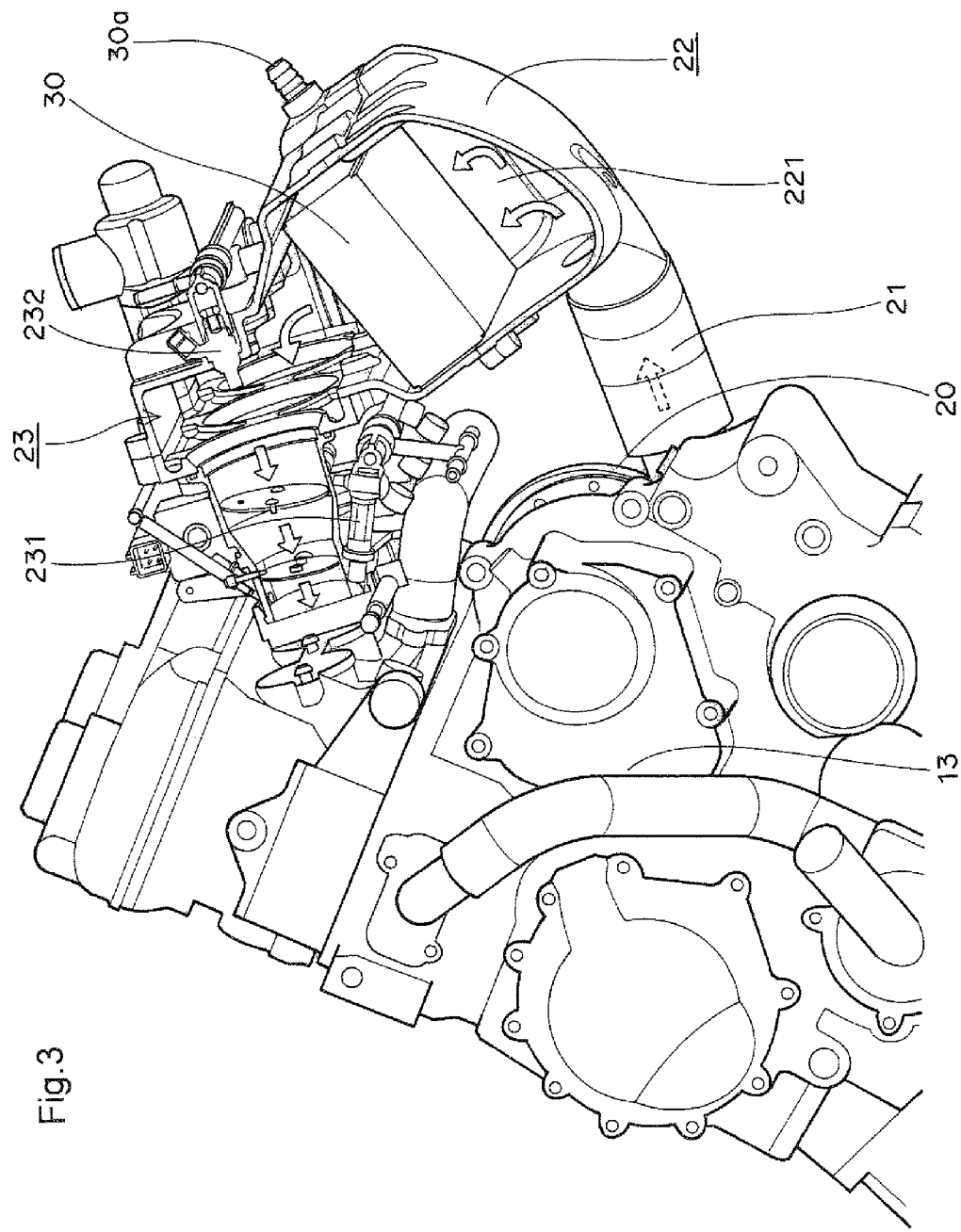
FIG. 3 is a left perspective view of the vicinity of the air intake chamber.

FIG. 2 is a right perspective view of the vicinity of the air intake chamber 22. FIG. 3 is a left perspective view of the vicinity of the air intake chamber 22. In FIG. 3, the interiors of the air intake chamber 22 and the throttle body 23 are made visible. In addition, in FIGS. 2 and 3, the flow of intake air is indicated by outline arrows.

As shown in FIG. 2, the supercharger 20 takes in air from an air take inlet 20a to rotate the air, and then compresses the air by its centrifugal force. The supercharger 20 is fixed to the engine 13. The air intake duct 21 connected to the supercharger 20 and the air intake chamber 22 is formed of a resilient member. Therefore, the air intake chamber 22 is floating supported to be shifted relative to the engine 13 and the supercharger 20. The air intake duct 21 is mounted on the air intake chamber 22 at the substantially center thereof in the vehicle width direction (the left-right direction shown in FIG. 4). The air from the air intake duct 21 is uniformly sent into the air intake chamber 22. The air intake chamber 22 may be directly supported by the engine 13 or the body frame 8.

The throttle body 23 is connected via a resilient member 24 to the air intake port of the engine 13. The resilient member 24 is fastened by a band 25. Therefore, the throttle body 23 is floating supported to be shifted relative to the engine 13. The throttle body 23 may be directly supported by the engine 13 or the body frame 8.

A main injector 231 is provided in the lower portion of the throttle body 23 and in the vicinity of the air outlet of the throttle body 23, and injects the fuel. Further, a top injector 232 is provided in the upper portion of the throttle body 23 and in the air inlet of the throttle body 23, and injects the fuel. The main injector 231 and the top injector 232 are provided for each cylinder.

As shown in FIGS. 1 and 3, a volume portion 221 having a fixed volume is provided on the air intake upstream side of the intercooler 30 in the air intake chamber 22.

In the mounting portion of the intercooler 30 in the air intake chamber 22, the cross-sectional area of the intercooler 30 perpendicular to the air intake direction is substantially equal to the cross-sectional area of the air intake chamber 22 perpendicular to the air intake direction. That is, in the mounting portion of the intercooler 30 in the air intake chamber 22, almost no space is formed between the inner surface of the air intake chamber 22 and the outer surface of the intercooler 30. Most of the air from the volume portion 221 passes through the interior of the intercooler 30 toward the throttle body 23.

Figure 4:
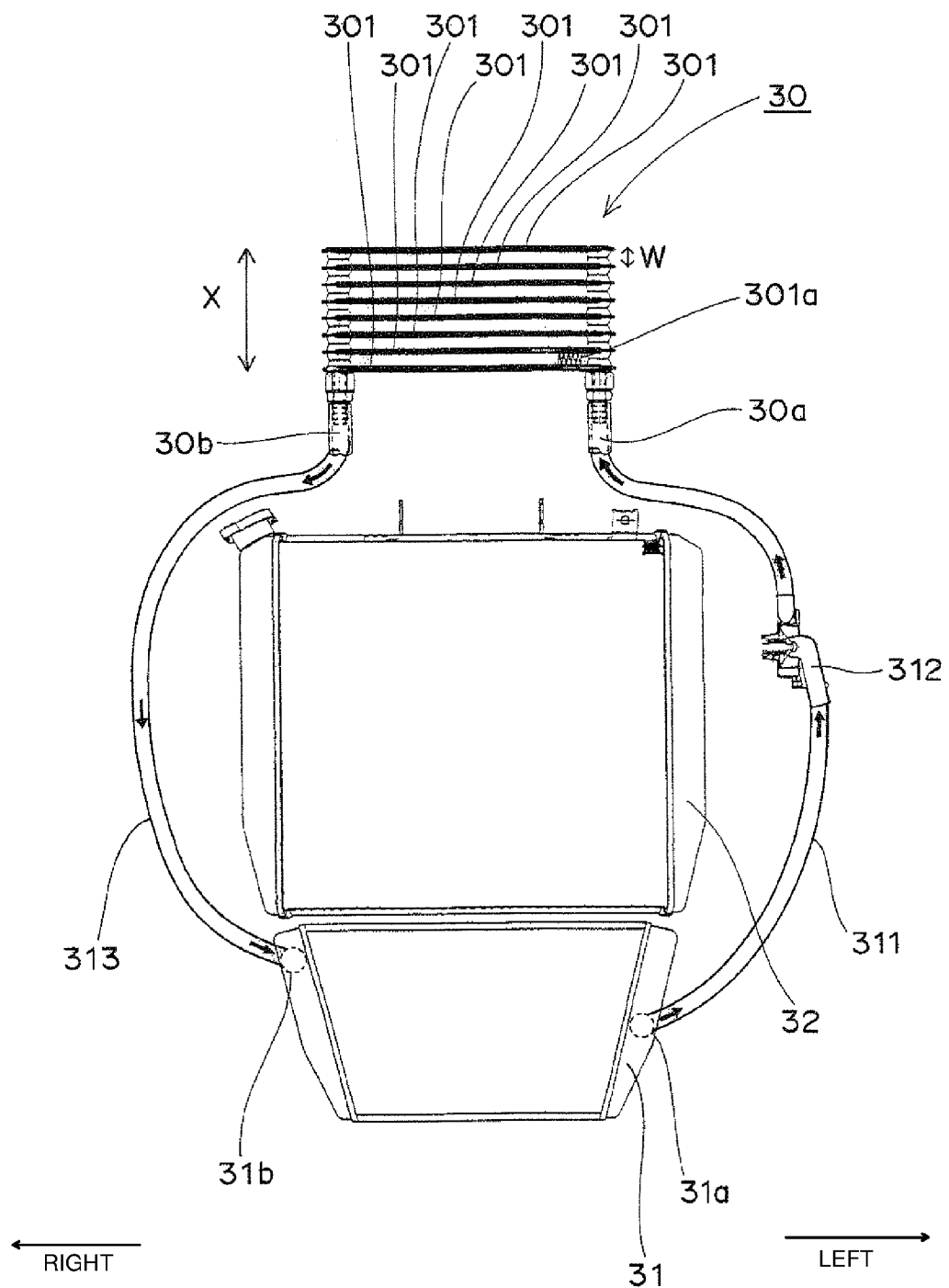
FIG. 4 is a schematic diagram showing the cooling water route of an intercooler.

FIG. 4 is a schematic diagram showing the cooling water route of the intercooler 30. In FIG. 4, the flow of cooling water is indicated by black arrows. As shown in FIGS. 1 and 4, a radiator 31 for the intercooler 30 is provided below an engine radiator 32 cooling engine cooling water. The radiator 31 for the intercooler 30 and the engine radiator 32 are arranged in front of the engine 13 and behind the front wheel 2. The cooling water flowing in the radiator 31 and the cooling water flowing in the engine radiator 32 are cooled by running wind from the front of the vehicle body. In the radiator 31, the cooling water cooled by the running wind is sent from a radiator outlet 31a through a cooling water pipe 311 into a cooling water pump 312. The cooling water pump 312 sends the cooling water into the intercooler 30 through an inlet 30a thereof. As shown in FIG. 1, the cooling water pump 312 is arranged below the engine 13 and behind the radiator 31. In addition, the cooling water pump 312 is an electrically operated pump operated by an electrically operated motor based on a signal from an engine control unit (ECU), and can be operated irrespective of the power of the rotational shaft of the engine 13.

As shown in FIG. 4, the intercooler 30 has a plurality of plates 301 each incorporating a cooling water passage and stacked with space in the up-down direction W in the direction (X direction) perpendicular to the air intake direction (in FIG. 4, in the direction perpendicular to the sheet) so that air passes through space W. The intercooler 30 cools the air flowing through space W by the cooling water flowing in each of the plates 301. The cooling water which cools the air returns from an outlet 30b through a cooling water pipe 313 into an inlet 31b of the radiator 31. A plurality of fins 301a are formed on at least one side of the plate 301, although only some of them are shown in FIG. 4.

Figure 5:
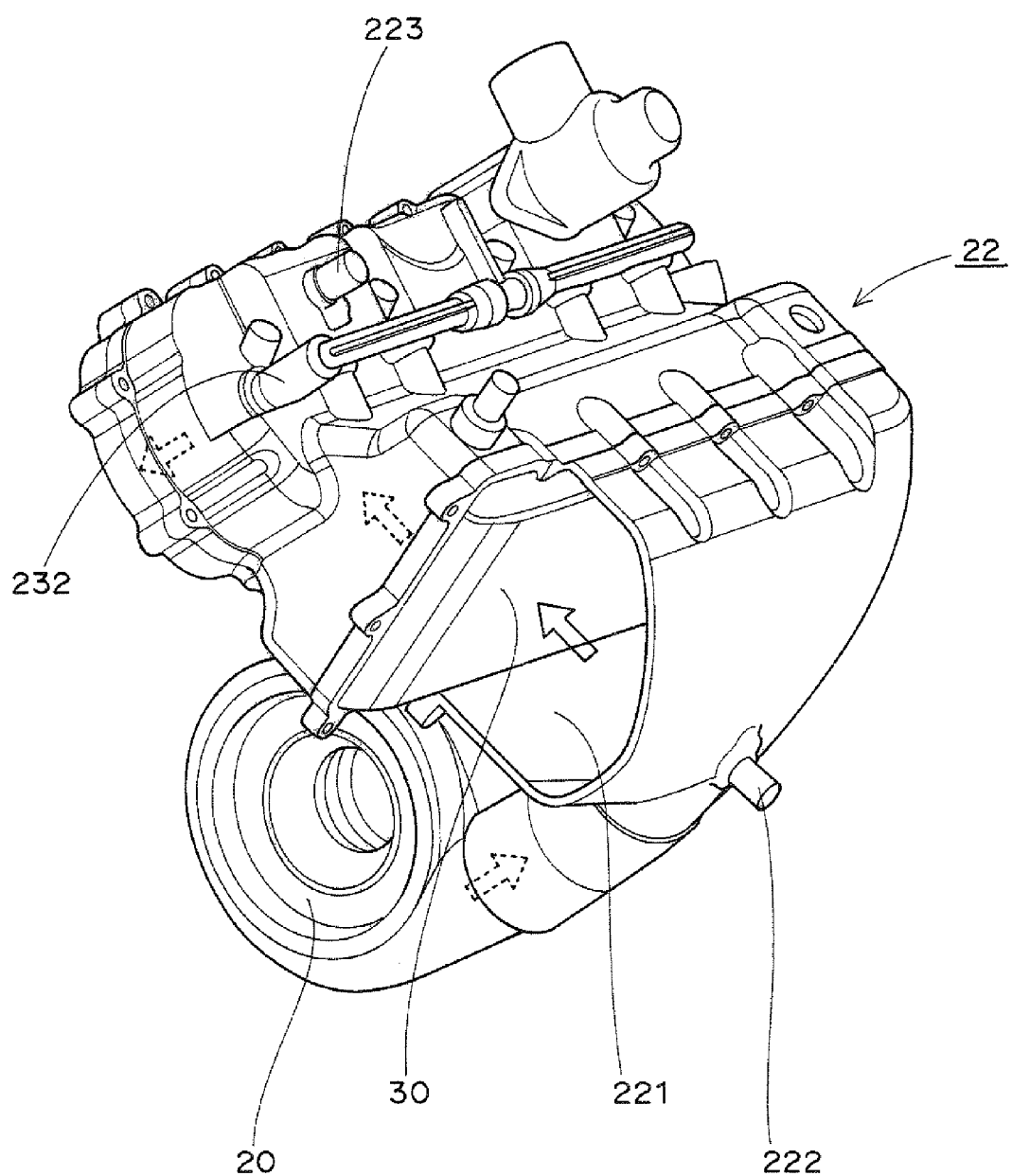
FIG. 5 is a left perspective view of the air intake chamber in the direction different from FIG. 3.

FIG. 5 is a left perspective view of the air intake chamber 22 in the direction different from FIG. 3. In FIG. 5, the flow of intake air is indicated by outline arrows. As shown in FIG. 5, the air intake chamber 22 is provided with an upstream intake air sensor 222 near the air intake inlet thereof and a downstream intake air sensor 223 near the air intake outlet thereof. The upstream intake air sensor 222 measures the temperature of the intake air at high temperature compressed by the supercharger 20. The downstream intake air sensor 223 measures the temperature of the intake air cooled by the intercooler 30 and to which the fuel is injected from the top injector 232.

The control unit (not shown) of the engine 13 controls the cooling water pump 312 and the ignition time of the engine 13 from the temperature difference between the temperature of the intake air detected by the upstream intake air sensor 222 and the temperature of the intake air detected by the downstream intake air sensor 223. Specifically, when the temperature difference is small so that the control unit identifies that the intake air is not sufficiently cooled, the control unit increases the amount of water supply from the cooling water pump 312 to improve the intake air cooling performance of the intercooler 30. In addition, when the intake air is not sufficiently cooled, knocking is likely to be caused in the engine 13. Therefore, when identifying that the intake air is not sufficiently cooled, the control unit retards (delays) the ignition time to prevent knocking.

According to the air intake structure of the engine 13 of the above configuration, the following effects can be exhibited.

(1) The liquid cooling type intercooler 30 using the cooling water is provided in the air intake chamber 22. Therefore, it is unnecessary to provide an air intake passage for passing intake air through the intercooler 30. Pressure loss for cooling the intake air can thus be reduced. In addition, in the motorcycle 1 in which the space for arranging each vehicle member is limited, the intercooler 30 is provided in the air intake chamber 22. Therefore, the vehicle can be maintained compact.

(2) The top injector 232 is provided on the air intake downstream side of the intercooler 30, and injects the fuel from the inlet of the throttle body 23. Therefore, intake air cooled by the intercooler 30 can be further cooled with the vaporization heat of the fuel. As a result, the output of the engine 13 can be further improved.

(3) The intercooler 30 has the plates 301 each incorporating a cooling liquid passage and stacked to be spaced from each other in the direction (X direction) perpendicular to the air intake direction. The flow of intake air which passes through between the plates 301 to be cooled can be straightened by the plates 301. As a result, the intake air can be smoothly sent from the air intake chamber 22 to the throttle body 23.

(4) The fins 301a are formed on at least one side of each of the plates 301. Therefore, the contact area of the plate 301 with intake air can be made larger. Therefore, the intake air cooling effect of the intercooler 30 can be improved. In addition, the straightening of the flow of intake air which passes through between the plates 301 to be cooled can be further promoted by the fins 301a.

(5) The volume portion 221 is provided on the upstream side of the intercooler 30. Therefore, intake air to enter into the intercooler 30 is made uniform by the volume portion 221, and can be uniformly sent to the intercooler 30. In addition, in this embodiment, nothing is provided in the volume portion 221. However, the volume portion 221 can straighten the flow of intake air entering into the intercooler 30 by being provided with a punching metal having a plurality of through-holes in the air intake direction.

(6) The cross-sectional area of the intercooler 30 perpendicular to the air intake direction is substantially equal to the cross-sectional area of the air intake chamber 22 perpendicular to the air intake direction. Therefore, all of intake air in the air intake chamber 22 passes through the interior of the intercooler 30, and can be effectively cooled.

(7) The throttle body 23 and the air intake chamber 22 are floating supported relative to the engine 13. Therefore, vibration can be unlikely to be transmitted from the engine 13 to the throttle body 23 and the air intake chamber 22. As a result, damage to the throttle body 23 and the air intake chamber 22 due to vibration can be prevented.

(8) The intercooler 30 circulates the cooling water via the dedicated cooling water pump 312 and the dedicated radiator 31 to cool intake air. As compared with the use of the engine cooling water (the highest temperature of approximately about 90° C.) to cool the intake air, the use of the cooling water at low temperature (the highest temperature of approximately about 50° C.) can improve the intake air cooling effect.

(9) The cooling water pump 312 is not operated by the rotation of the rotational shaft of the engine, and is operated by the electrically operated motor based on the signal from the ECU. Therefore, the cooling water pump 312 can change the amount of the cooling water according to the state of the engine, the temperature of intake air, knocking, and an output to be required. As a result, the intake air can be efficiently cooled in the intercooler 30.

(10) The radiator 31 for the intercooler 30 is arranged side by side
in the up-down direction with respect to the engine radiator 32 cooling the engine cooling water. Therefore, the radiator 31 can be easily arranged.

(11) The radiator 31 is arranged below the engine radiator 32, and the cooling water pump 312 is arranged below the engine 13 and behind the radiator 31. Therefore, the path from the radiator 31 to the cooling water pump 312 can be shortened.

In the present embodiment, the intercooler 30 circulates the cooling water via the dedicated cooling water pump 312 and the dedicated radiator 31 to tool intake air. However, the intercooler may use the engine cooling water to cool the intake air. In this case, it is unnecessary to provide the cooling water system (the radiator 31, the cooling water pump 312, and the cooling water pipes 311 and 313). The cooling equipment can thus be made streamlined.

In the present embodiment, a plurality of fins 301a are formed on one side of each of the plates 301 of the intercooler 30. However, a plurality of fins may be formed on both sides of the plate 301. In addition, when the cooling performance of the intercooler 30 is sufficient, the fins 301a may not be formed.

In the present embodiment, the cooling water is used for cooling intake air in the intercooler 30. However, the coolant is not limited to water, and may be liquid, e.g., oil and antifreezing liquid.

Second Embodiment

Figure 6:
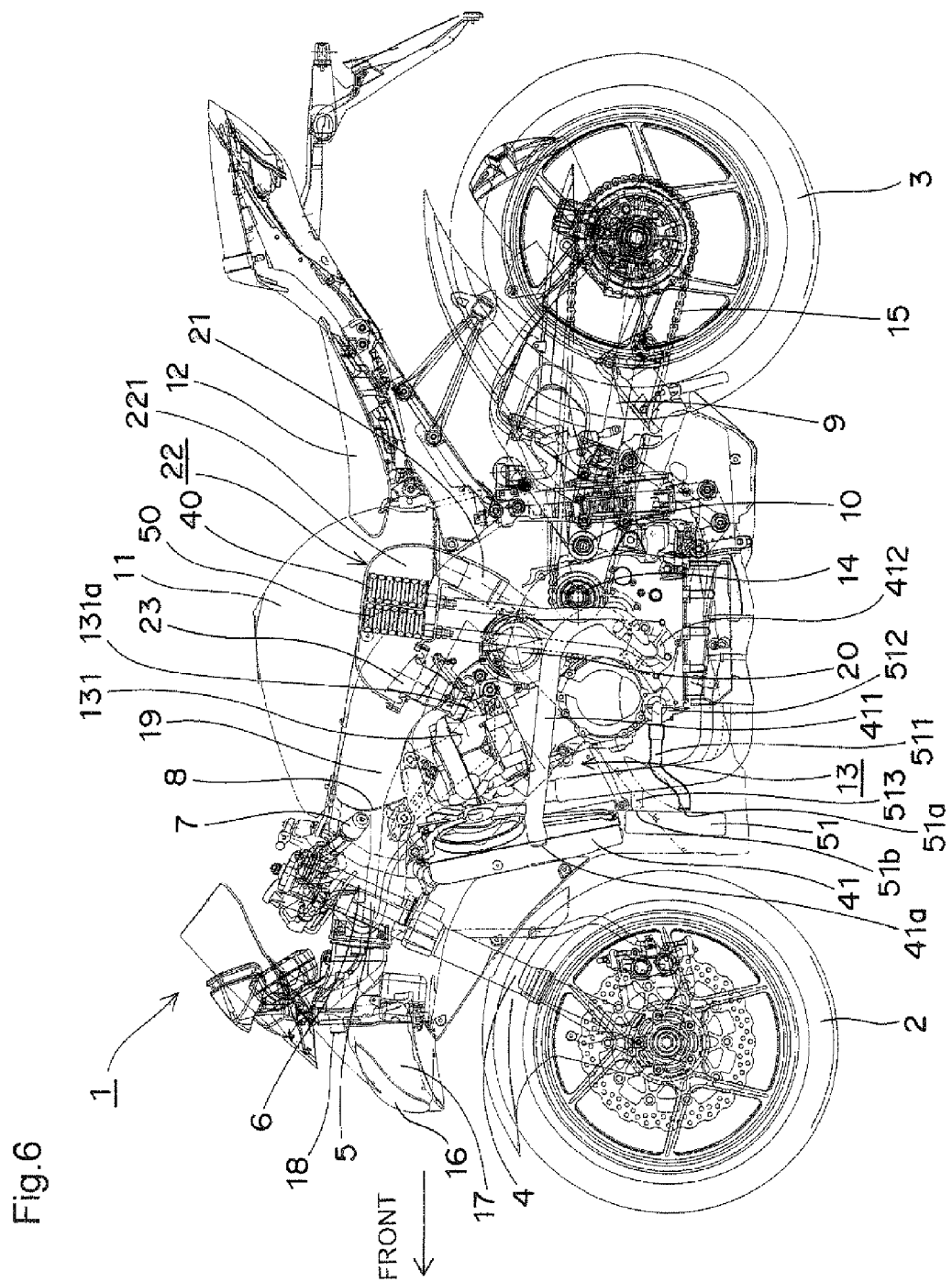
FIG. 6 is a left side view of a motorcycle having an air intake structure of an engine according to a second embodiment of the present invention.

FIG. 6 is a left side view of the motorcycle 1 having an air intake structure of an engine according to a second embodiment of the present invention. FIG. 6 shows the perspective state of a front cowl covering a body frame and the like. The second embodiment is the same as the first embodiment except that while one intercooler is provided in the air intake chamber 22 in the first embodiment, two intercoolers are provided in the air intake chamber 22 in the second embodiment. Therefore, in the description of the second embodiment, the same components and portions as the first embodiment are indicated by similar reference numerals, and the detailed description of their contents is omitted.

As shown in FIG. 6, two intercoolers 40 and 50 are arranged side by side in the air intake direction in the air intake chamber 22. Like the first embodiment, the volume portion 221 having a fixed volume is provided on the air intake upstream side of the upstream intercooler 40. The downstream intercooler 50 is provided on the immediately downstream side of the upstream intercooler 40. Almost no space is formed between the upstream intercooler 40 and the downstream intercooler 50.

The upstream intercooler 40 circulates the engine cooling water to cool intake air. The downstream intercooler 50 circulates the cooling water via a dedicated cooling water pump 512 and a dedicated radiator 51 to cool the intake air.

In the mounting portion of the intercooler 40 in the air intake chamber 22, the cross-sectional area of the intercooler 40 perpendicular to the air intake direction is substantially equal to the cross-sectional area of the air intake chamber 22 perpendicular to the air intake direction. That is, in the mounting portion of the intercooler 40 in the air intake chamber 22, almost no space is formed between the inner surface of the air intake chamber 22 and the outer surface of the intercooler 40. Most of air from the volume portion 221 passes through the interior of the intercooler 40 toward the intercooler 50.

Likewise, in the mounting portion of the intercooler 50 in the air intake chamber 22, the cross-sectional area of the intercooler 50 perpendicular to the air intake direction is substantially equal to the cross-sectional area of the air intake chamber 22 perpendicular to the air intake direction. That is, in the mounting portion of the intercooler 50 in the air intake chamber 22, almost no space is formed between the inner surface of the air intake chamber 22 and the outer surface of the intercooler 50. Most of the air from the intercooler 40 passes through the interior of the intercooler 50 toward the throttle body 23.

Figure 7:
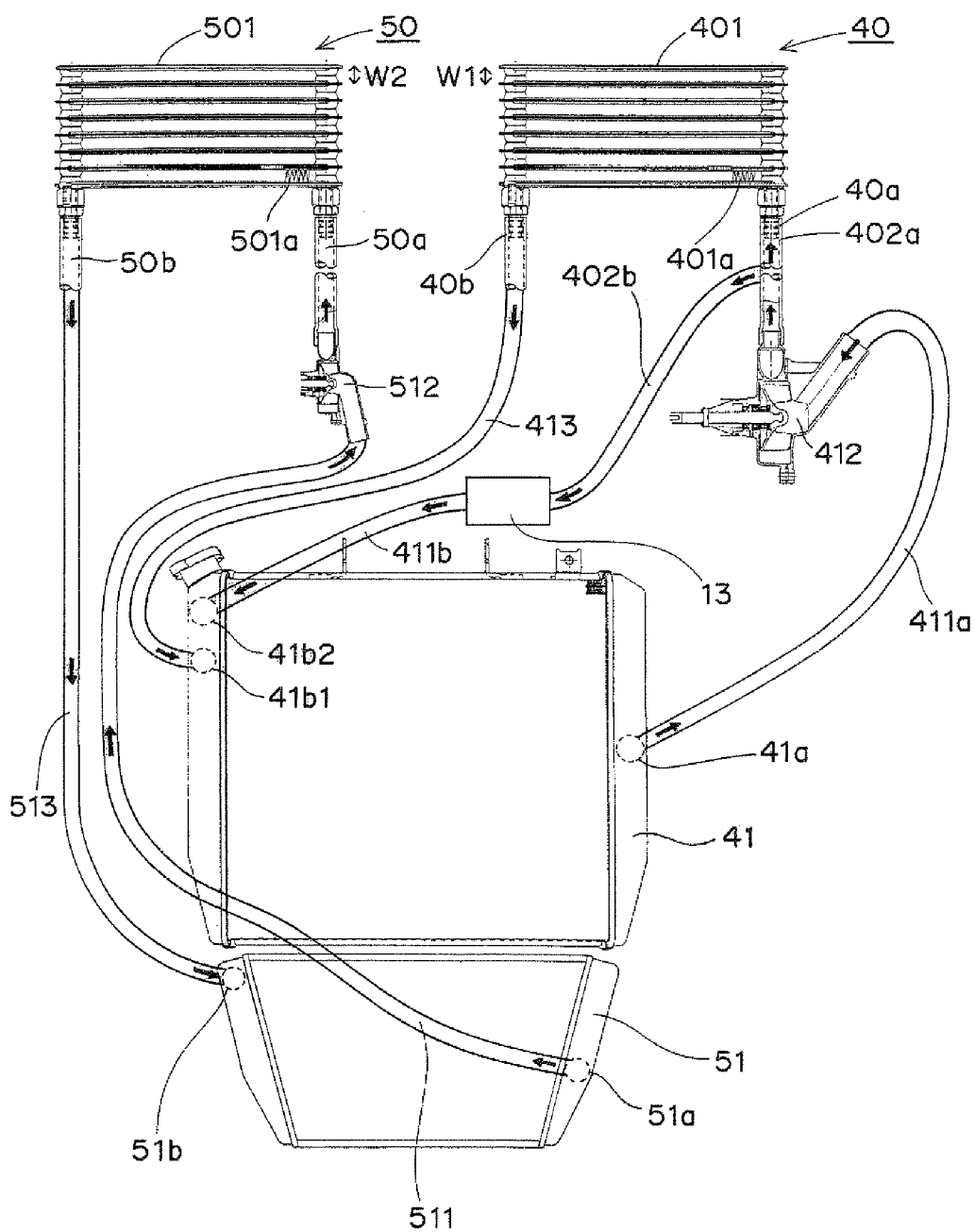
FIG. 7 is a schematic diagram showing the cooling water routes of an upstream intercooler and a downstream intercooler.

FIG. 7 is a schematic diagram showing the cooling water routes of the upstream intercooler 40 and the downstream intercooler 50. In FIG. 7, an engine radiator 41 has two cooling water inlets (inlets 41b1 and 41b2) and one cooling water outlet (an outlet 41a). In FIG. 7, the flow of the cooling water is indicated by black arrows. As shown in FIGS. 6 and 7, the intercooler 40 uses the engine cooling water to cool the intake air. The engine radiator 41 is arranged in front of the engine 13 and behind the front wheel 2. The cooling water flowing in the engine radiator 41 is cooled by running wind from the front of the vehicle body. In the engine radiator 41, the cooling water cooled by the running wind is sent from the engine radiator outlet 41a through a cooling water pipe 411a into an engine cooling water pump 412. In the outlet of the engine cooling water pump 412, the cooling water route is branched into cooling water pipes 402a and 402b. The cooling water which passes through the cooling water pipe 402a is sent into the intercooler 40 through an inlet 40a thereof. As shown in FIG. 6, the engine cooling water pump 412 is arranged below the engine 13. In addition, the cooling water which passes through the cooling water pipe 402b is sent into the engine 13 to cool the member configuring the engine 13. Therefore, the cooling water to cool the engine 13 can be supplied into the intercooler 40. The intake air can thus be effectively cooled in the intercooler 40. The cooling water which cools the engine 13 returns through a cooling water pipe 411b into the inlet 41b2 of the engine radiator 41.

As shown in FIG. 7, the intercooler 40 has the same configuration as the intercooler 30, and has a plurality of plates 401 each incorporating a cooling water passage and stacked with space in the up-down direction W1 in the direction perpendicular to the air intake direction so that air passes through space W1. The intercooler 40 cools the air flowing through space W1 by the cooling water flowing in each of the plates 401. The cooling water which cools the air returns from an outlet 40b through a cooling water pipe 413 into the inlet 41b1 of the radiator 41. A plurality of fins 401a are formed on at least one side of the plate 401, although only some of them are shown in FIG. 7.

As shown in FIGS. 6 and 7, the intercooler 50 circulates the cooling water via the dedicated cooling water pump 512 and the dedicated radiator 51 to cool the intake air. The radiator 51 is arranged in front of the engine 13, behind the front wheel 2, and below the engine radiator 41. In the radiator 51, the cooling water flowing in the radiator 51 is cooled by running wind from the front of the vehicle body. In the radiator 51, the cooling water cooled by the running wind is sent from a radiator outlet 51a through a cooling water pipe 511 into the cooling water pump 512. The cooling water pump 512 sends the cooling water into the intercooler 50 through an inlet 50a thereof. The cooling water pump 512 is arranged below the engine 13 and behind the radiator 51.

As shown in FIG. 7, the intercooler 50 has the same configuration as the intercoolers 30 and 40, and has a plurality of plates 501 each incorporating a cooling water passage and stacked with space in the up-down direction W2 in the direction perpendicular to the air intake direction so that air passes through space W2. The intercooler 50 cools the air flowing through space W2 by the cooling water flowing in each of the plates 501. The cooling water which cools the air returns from an outlet 50b through a cooling water pipe 513 into an inlet 51b of the radiator 51. A plurality of fins 501a are formed on at least one side of the plate 501, although only some of them are shown in FIG. 7.

Figure 8:
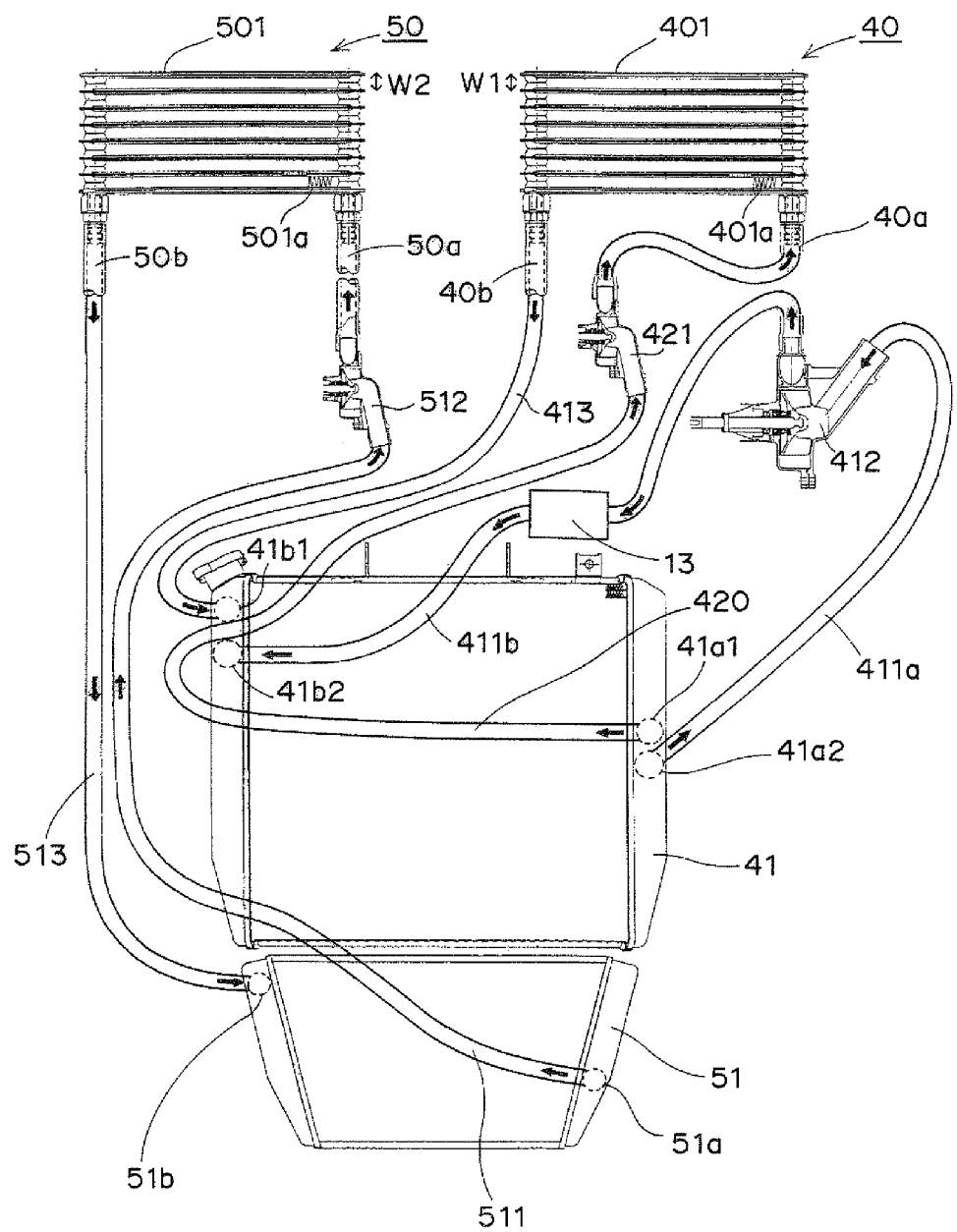
FIG. 8 is a schematic diagram showing the cooling water routes of the upstream intercooler and the downstream intercooler, which are different from FIG. 7.

FIG. 8 is a schematic diagram showing the cooling water routes of the upstream intercooler 40 and the downstream intercooler 50, which are different from FIG. 7. In FIG. 8, the engine radiator 41 has two cooling water inlets and two cooling water outlets (the inlets 41b1 and 41b2 and outlets 41a1 and 41a2). A cooling water pump 421 for the upstream intercooler 40 is further provided. As a result, the cooling water route cooling the engine 13 and the cooling water route cooling air by the upstream intercooler 40 are arranged in parallel. The cooling water pump 421 has the same configuration as the cooling water pump 512. In addition, in FIG. 9, the flow of the cooling water is indicated by black arrows.

In the engine radiator 41, the cooling water cooled by running wind is sent from the engine radiator outlet 41a2 through the cooling water pipe 411a into the engine cooling water pump 412. The engine cooling water pump 412 sends the cooling water into the engine 13. The cooling water sent into the engine 13 cools the member configuring the engine 13. The cooling water which cools the engine 13 returns through the cooling water pipe 411b into the inlet 41b2 of the engine radiator 41.

In addition, in the engine radiator 41, the cooling water cooled by the running wind is sent from the engine radiator outlet 41a1 through a cooling water pipe 420 into the cooling water pump 421. The cooling water pump 421 sends the cooling water into the intercooler 40 through the inlet 40a thereof. The cooling water which cools the air in the intercooler 40 returns from the outlet 40b through the cooling water pipe 413 into the inlet 41b1 of the engine radiator 41. The cooling water route of the downstream intercooler 50 is the same as FIG. 7.

Figure 9:
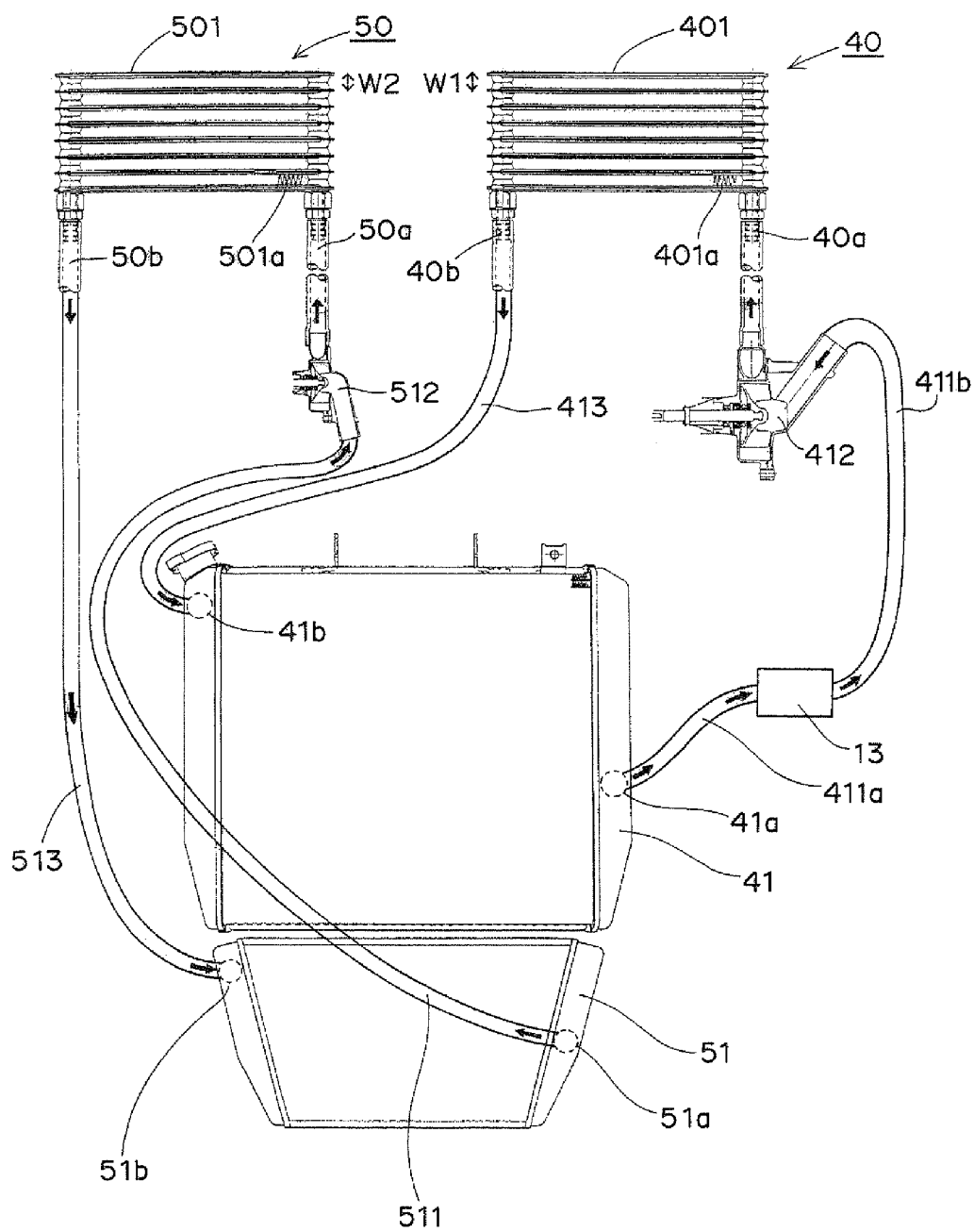
FIG. 9 is a schematic diagram showing the cooling water routes of the upstream intercooler and the downstream intercooler, which are different from FIGS. 7 and 8.

FIG. 9 is a schematic diagram showing the cooling water routes of the upstream intercooler 40 and the downstream intercooler 50, which are different from FIGS. 7 and 8. In FIG. 9, the engine radiator 41 has one cooling water inlet and one cooling water outlet (an inlet 41b and the outlet 41a). In addition, in FIG. 9, the flow of the cooling water is indicated by black arrows.

In the engine radiator 41, the cooling water cooled by running wind is sent from the engine radiator outlet 41a through the cooling water pipe 411a into the engine 13 to cool the member configuring the engine 13. The cooling water which cools the engine 13 is sent through the cooling water pipe 411b into the engine cooling water pump 412. The engine cooling water pump 412 sends the cooling water into the intercooler 40 through the inlet 40a thereof. The cooling water which cools the air in the intercooler 40 returns from the outlet 40b through the cooling water pipe 413 into the inlet 41b of the engine radiator 41. The cooling water route of the downstream intercooler 50 is the same as FIGS. 7 and 8.

The engine cooling water pump 412 is operated by the power of the rotational shaft of the engine 13. The cooling water pumps 421 and 512 are an electrically operated pump operated by an electrically operated motor based on a signal from an engine control unit (ECU), and can be operated irrespective of the power of the rotational shaft of the engine 13.

According to the air intake structure of the engine 13 of the above configuration, the following effects can be exhibited.

(1) The upstream intercooler 40 and the downstream intercooler 50 are arranged side by side in the air intake direction in the air intake chamber 22. The upstream intercooler 40 circulates the engine cooling water to cool intake air. The downstream intercooler 50 circulates the cooling liquid via the dedicated cooling water pump 512 and the dedicated radiator 51 to cool the intake air. Therefore, the upstream intercooler 40 using the engine cooling water at relatively high temperature cools the intake air at high temperature, and the downstream intercooler 50 using the cooling water at relatively low temperature further cools the intake air. That is, the upstream intercooler 40 is combined with the downstream intercooler 50. Therefore, the engine cooling water in the engine radiator 41 and the cooling water in the radiator 51 can be efficiently used for cooling the intake air. As compared with when the intake air is cooled only by the downstream intercooler, the cooling performance required for the downstream intercooler can thus be reduced. That is, the downstream intercooler 50, the radiator 51, and the cooling water pump 512 can be made streamlined.

(2) The cross-sectional area of the upstream intercooler 40 and the downstream intercooler 50 perpendicular to the air intake direction is substantially equal to the cross-sectional area of the air intake chamber 22 perpendicular to the air intake action. Therefore, all of intake air in the air intake chamber 22 passes through the interiors of the upstream intercooler 40 and the downstream intercooler, and can be effectively cooled.

(3) Like the first embodiment, in this embodiment, the top injector 232 is provided on the air intake downstream side of the downstream intercooler 50 and in the inlet of the throttle body 23. The fuel is injected on the air intake downstream side of the downstream intercooler 50 and from the inlet of the throttle body 23. Therefore, intake air cooled by the downstream intercooler 50 can be further cooled with the vaporization heat of the fuel. As a result, the output of the engine 13 can be further improved.

(4) The cooling water pumps 421 and 512 are not operated by the rotation of the rotational shaft of the engine, and are operated by the electrically operated motor based on the signal from the ECU. Therefore, the cooling water pumps 421 and 512 can change the amount of the cooling water according to the state of the engine, the temperature of intake air, knocking, and an output to be required. As a result, the intake air can be efficiently cooled in the intercoolers 40 and 50.

(5) The radiator 51 for the intercooler 50 is arranged side by side in the up-down direction with the engine radiator 41 cooling the engine cooling water. Therefore, the radiator 51 can be easily arranged.

(6) The radiator 51 is arranged below the engine radiator 41, and the cooling water pump 512 is arranged below the engine 13 and behind the radiator 51. Therefore, the path from the radiator 51 to the cooling water pump 512 can be shortened.

In this embodiment, one upstream intercooler 40 and one downstream intercooler 50 are provided, but a plurality of upstream intercoolers 40 and a plurality of downstream intercoolers 50 may be provided. However, each upstream intercooler 40 is required to use the engine cooling water, and each downstream intercooler 50 is required to use the dedicated cooling water. In this embodiment, the cooling water is used for cooling intake air in the downstream intercooler 50. However, the coolant is not limited to water, and may be liquid, e.g., oil and antifreezing liquid.

The upstream intercooler 40 and the downstream intercooler 50 have the same structure, but the plates may be different in area and number and the space between the plates may be different. In addition, a plurality of fins 401a are formed on one side of each of the plates 401, and a plurality of fins 501a are formed on one side of each of the plates 501. However, a plurality of fins may be formed on both sides of the plate 401, and the fins may be formed on both sides of the plate 501. Further, when the cooling performance of the upstream intercooler 40 and the downstream intercooler 50 is sufficient, the fins 401a and 501a may not be formed.

In the present embodiments, the cooling water pumps 421 and 512 are an electrically operated pump. However, like the engine cooling water pump 412, the cooling water pumps 421 and 512 may be operated by the power of the rotational shaft of the engine 13.

In the embodiments, the cooling liquid (the coolant is not limited to water) in the intercooler 30 and the downstream intercooler 50 not using the engine cooling water does not require engine lubrication ability. Therefore, the cooling liquid in the intercooler 30 and the downstream intercooler 50 can be different from the engine cooling water. For instance, the cooling liquid which is more excellent in heat exchange with air than the engine cooling water can be used.

In the embodiments, the cooling water pump 312 is provided below the engine 13. However, the cooling water pumps 312 and 421 may be arranged above or behind the engine 13.

In the embodiments, the front arm structure which swingably supports the front wheel 2 by a swing arm, not by the front fork 4, is adopted. Therefore, the front fork 4 blocking the front of the radiator can be eliminated. As a result, running wind guided by the radiator can be increased to improve the cooling performance of the radiator.

In the embodiments, the top injector 232 is inclined rearward downward, and is arranged in front of the air intake port of the throttle body 23. Therefore, the space of the air intake chamber 22 can be larger and the top injector 232 can be prevented from obstructing the flow of intake air.

In addition, in place of the intercooler, a lattice through which air can pass and to which the fuel adheres may be provided. The fuel adheres to such a lattice to be vaporized so that the lattice can be cooled. As a result, the temperature increase in the air intake chamber 22 can be prevented. In particular, the intercooler or the lattice is arranged between the air intake port of the throttle body 23 and the top injector 232. The fuel easily adheres to the surface of the intercooler or the surface of the lattice. The cooling effect of the intercooler or the lattice can be further improved.

In the embodiments, the motorcycle has been taken as an example. However, the present invention is not limited to the air intake structure of the engine of the motorcycle, and is widely applicable the engine of a vehicle having a supercharger.

The present invention is not limited to the configuration described in the embodiments, and can include various modification examples which can be contrived by those skilled in the art without departing from the contents described in the claims.

INDUSTRIAL APPLICABILITY

The present invention can provide the air intake structure of the engine capable of cooling intake air compressed by the supercharger by reducing pressure loss, and therefore is of great industrial utilization value.

DESCRIPTION OF REFERENCE SIGNS

1: Motorcycle
2: Front wheel
3: Rear wheel
4: Front fork
5: Steering shaft
6: Head pipe
7: Steering wheel
8: Body frame
9: Swing arm
10: Pivot bolt
11: Fuel tank 12: Seat
13: Engine
131: Cylinder head
131a: Air intake port
14: Output sprocket
15: Chain
16: Head lamp
17: Front cowl
18: Air intake duct
19: Air intake passage
20: Supercharger
21: Air intake duct
22: Air intake chamber
221: Volume portion
222: Upstream intake air sensor
223: Downstream intake air sensor
23: Throttle body
231: Main injector
232: Top injector
24: Resilient member
25: Band
30: Intercooler
301: Plate
31: Radiator
311: Cooling water pipe
312: Cooling water pump
313: Cooling water pipe
32: Engine radiator
40: Upstream intercooler
41: Engine radiator
412: Engine cooling water pump
421: Cooling water pump
50: Downstream intercooler
51: Radiator
512: Cooling water pump

The invention claimed is:

1. An air intake structure of a supercharged engine for a vehicle comprising:
a supercharger supercharging air;
an air intake chamber arranged above the engine and below a fuel tank receiving the air supercharged from the supercharger and delivering the supercharged air to the engine;
a throttle body connected to an air intake downstream side of the air intake chamber;
an air intake port of a cylinder head of the engine connected to an air intake downstream side of the throttle body;
a liquid cooling type intercooler provided in the air intake chamber; and
a cooling pump pumping cooling liquid into the intercooler arranged below the air intake chamber;
wherein the vehicle is a motorcycle.

2. The air intake structure of the engine according to claim 1, wherein the intercooler receives the cooling liquid which is cooled by a radiator and does not cool the engine.

3. The air intake structure of the engine according to claim 1, wherein the intercooler receives the cooling liquid which is cooled by a radiator before cooling the engine.

4. The air intake structure of the engine according to claim 1, wherein the intercooler circulates engine cooling liquid to cool intake air,
the air intake structure further comprising:
a cooling liquid pipe for the engine cooling liquid branched into a side flowing into the engine and a side flowing into the intercooler on an upstream side of the intercooler with respect to a flow of the engine cooling liquid.

5. The air intake structure of the engine according to claim 1,
wherein the intercooler is a first intercooler;
the air intake structure further comprising a second intercooler and a cooling liquid pipe for the cooling liquid, wherein
the first and second intercoolers are arranged side by side in an air intake direction in the air intake chamber, the second intercooler being arranged on an air intake downstream side of the first intercooler;
the first intercooler circulates the engine cooling liquid to cool intake air;
the second intercooler circulates the cooling liquid via a dedicated pump and a dedicated radiator to cool intake air; and
the cooling liquid pipe is branched into a side flowing into the engine and a side flowing into the first intercooler on an upstream side of the first intercooler with respect to a flow of the engine cooling fluid.

6. The air intake structure of the engine according to claim 1, wherein a portion of the intercooler which is connected to the cooling pump is arranged at a lower side of the intercooler.

7. The air intake structure of the engine according to claim 1, wherein an inlet and an outlet of the intercooler are arranged at a lower side of the intercooler.

8. The air intake structure of the engine according to claim 1, wherein the cooling pump is arranged below, above or behind the engine.

9. The air intake structure of the engine according to claim 1, further comprising a radiator, wherein
intake air flows in the air intake chamber in a front-back direction of the motorcycle;
the intercooler is a plate type cooling device having a plurality of plates which each incorporate a cooling liquid passage therein, the plates being stacked so as to be spaced from each other in a direction perpendicular to an air intake direction such that cooling air passes through between the plates, the plates extending in a vehicle width direction, and the cooling liquid passages being connected to an inlet and an outlet of the intercooler;
the inlet of the intercooler is arranged at one side of the intercooler in the vehicle width direction, the outlet of the intercooler is arranged at an opposite side of the intercooler in the vehicle width direction; and
an inlet of the radiator is arranged at one side of the radiator in the vehicle width direction, and an outlet of the radiator is arranged at an opposite side of the radiator in the vehicle width direction.

10. The air intake structure of the engine according to claim 1, wherein the supercharger has an air intake inlet opened in a vehicle width direction such that the supercharger takes in air from the air intake inlet to rotate the air around an axis extending in the vehicle width direction, and compresses the air by its centrifugal force, and the compressed air extends in the air intake chamber in the vehicle width direction and flows through the intercooler in a front-back direction of the motorcycle.

11. The air intake structure of the engine according to claim 10, wherein an air intake duct is mounted on the air intake chamber at the center of the air intake chamber in the vehicle width direction.

12. The air intake structure of the engine according to claim 10, wherein the supercharger is arranged above a crankcase of the engine and behind a cylinder of the engine relative to a front of the motorcycle, and the air intake chamber is arranged above the supercharger, and in front of the supercharger and behind the engine relative to the front of the motorcycle.

13. The air intake structure of the engine according to claim 1, wherein the intercooler is a plate type cooling device having a plurality of plates which each incorporate a cooling liquid passage therein, the plates being stacked so as to be spaced from each other in a direction perpendicular to an air intake direction such that cooling air passes through between the plates, the plates extending in a vehicle width direction.

14. The air intake structure of the engine according to claim 1, wherein the throttle body is provided for each cylinder, an outlet of the air intake chamber is connected to the throttle body, and the air intake chamber extends in a vehicle width direction.

15. The air intake structure of the engine according to claim 1, wherein a fuel injector is provided on an air intake downstream side of the intercooler and is provided for each cylinder of the engine, and fuel is injected to an inlet of the throttle body and to an air intake downstream side of the throttle body.

16. An air intake structure of an engine for a supercharged vehicle comprising
a supercharger supercharging air;
an air intake chamber receiving the air supercharged by the supercharger and sending the supercharged air to the engine;
a throttle body connected to an air intake downstream side of the air intake chamber;
an air intake port of a cylinder head of the engine connected to an air intake downstream side of the throttle body;
a liquid cooling type intercooler provided in the air intake chamber;
wherein the vehicle is a motorcycle, and
the supercharger has an air intake inlet opened in a vehicle width direction such that the supercharger takes in air from the air intake inlet to rotate the air around an axis extending in the vehicle width direction, and compresses the air by its centrifugal force, and the compressed air extends in the air intake chamber in the vehicle width direction and flows through the intercooler in a front-back direction of the motorcycle.

17. An air intake structure of a supercharged engine for a vehicle comprising
a supercharger supercharging air;
an air intake chamber receiving the air supercharged by the supercharger and sending the supercharged air to the engine;
a throttle body connected to an air intake downstream side of the air intake chamber;
an air intake port of a cylinder head of the engine connected to an air intake downstream side of the throttle body;
a liquid cooling type intercooler provided in the air intake chamber; and
a radiator,
wherein
intake air flows in the air intake chamber in a front-back direction of the motorcycle;
the intercooler is a plate type cooling device having a plurality of plates which each incorporate a cooling liquid passage therein, the plates being stacked so as to be spaced from each other in a direction perpendicular to an air intake direction such that cooling air passes through between the plates, the plates extending in a vehicle width direction, and the cooling liquid passages being connected to an inlet and an outlet of the intercooler;
the inlet of the intercooler is arranged at one side of the intercooler in the vehicle width direction, the outlet of the intercooler is arranged at an opposite side of the intercooler in the vehicle width direction; and
an inlet of the radiator is arranged at one side of the radiator in the vehicle width direction, and an outlet of the radiator is arranged at an opposite side of the radiator in the vehicle width direction; and
the vehicle is a motorcycle.

* * * * *